(12) United States Patent
Tarn et al.

(10) Patent No.: US 10,523,448 B2
(45) Date of Patent: Dec. 31, 2019

(54) POWER SOURCE EQUIPMENT FOR POWER OVER ETHERNET SYSTEM

(71) Applicant: IC Plus Corp., Hsinchu (TW)

(72) Inventors: Hann-Yun Tarn, Hsinchu (TW); Chef Hsiao, Hsinchu (TW)

(73) Assignee: IC PLUS CORP., Hsinchu (TW)

( * ) Notice: Subject to any disclaimer, the term of this patent is extended or adjusted under 35 U.S.C. 154(b) by 152 days.

(21) Appl. No.: 15/588,068

(22) Filed: May 5, 2017

(65) Prior Publication Data

US 2018/0139064 A1    May 17, 2018

(30) Foreign Application Priority Data

Nov. 15, 2016 (TW) .............................. 105137336 A

(51) Int. Cl.
*H04L 12/10* (2006.01)
*H04B 3/54* (2006.01)
*H02J 4/00* (2006.01)

(52) U.S. Cl.
CPC .............. *H04L 12/10* (2013.01); *H02J 4/00* (2013.01); *H04B 3/54* (2013.01); *H04B 3/548* (2013.01); *Y10T 307/696* (2015.04)

(58) Field of Classification Search
CPC . H04L 12/10; H04B 3/54; H04B 3/548; H02J 4/00; Y10T 307/696
USPC ......................................... 307/1, 3–4, 80, 83
See application file for complete search history.

(56) References Cited

U.S. PATENT DOCUMENTS 7,471,014 B2 * 12/2008 Lum ........................ H02J 1/10
                                                                    307/82
8,305,906 B2    11/2012 Karam
9,281,691 B2     3/2016 Ferentz et al.

* cited by examiner

*Primary Examiner* — Hal Kaplan
(74) *Attorney, Agent, or Firm* — Muncy, Geissler, Olds & Lowe, P.C.

(57) ABSTRACT

A power source equipment for power over Ethernet system comprising a plurality of power source devices, each configured to determine, after having determined the power source device is connected by an external device without a powered device (PD) signature, whether another power source device is connected by a power device with a PD signature. If the determination is positive, the two power source devices are determined having been connected by the same PD and power is supplied to the PD by the two power source devices.

14 Claims, 6 Drawing Sheets

POWER SOURCE EQUIPMENT FOR POWER OVER ETHERNET SYSTEM

CROSS REFERENCE TO RELATED APPLICATIONS

This non-provisional application claims priority under 35 U.S.C. § 119(a) on Patent Application No. 105137336 filed in Taiwan, the Republic of China on 2016 Nov. 15, the entire contents of which are hereby incorporated by reference.

FIELD OF INVENTION

This invention relates to a power source equipment for Power over Ethernet (PoE) system, in particular to a power source equipment comprising a plurality of power source devices and supplying higher power to powered devices through a plurality of signal/power channels in a Power over Ethernet system.

PRIOR ART

The Power over Ethernet (PoE) system used in the industry basically follows the IEEE802.3af and IEEE802.3at Standards released by IEEE (Institute of Electrical and Electronics Engineers). The standards provides a mechanism, with which limited power is transmitted via a signal cable consisted of two twisted pairs, without interfering with data communications through the twisted pairs. The standards define frameworks for the power source equipment (PSE) and the powered device (PD) usable in the PoE system. According to the standards, before a power source equipment may provide power to a powered device, the power source equipment must first determine whether the two twisted pairs are connected by a powered device and whether the powered device in connection is in compliance with the IEEE PoE standards. If the inspection found that the impedance values of the powered device are within a predetermined range, called a "Signature Resistance," the power source equipment determines the powered device a qualified powered device, whereby power is supplied thereto.

Under the IEEE 802.3af standard, for a signal/power channel (cable) consisted of two twisted pairs, the power supplied by a power source equipment shall not exceed 15.4 watts. This type of power source equipment is referred to as a Type 1 PSE and devices suitable for this Type 1 PSE are also known as low power consumption PSE/PD. In addition, the IEEE 802.3at standard defines that power supplied by a power source equipment to a signal/power channel (cable) consisted of two pairs of twisted pairs should not exceed 30 watts. This type of power source equipment is referred to as a Type 2 PSE and devices suitable for this Type 2 PSE are referred to as medium power consumption PSE/PD. In addition to the low and medium power consuming PSE/PDs described above, there are other types of PSEs and PDs that can supply/receive higher powers. This type of PSE/PDs are called high power consumption PSE/PDs.

Category 5e (CAT 5e) and Category 6 (CAT 6) cables, as defined by the ANSI/TIA/EIA-568-A Standards, provide cables consisted of two or four twisted pairs, suitable for carrying a power higher than that of the Type 1 or Type 2. Therefore, if a power source equipment of the first type or the second type mentioned above is connected with a cable using four twisted pairs, higher power can be provided to the powered device, without compromising the safety requirements specified in these two cable standards.

In order to provide higher power to the powered device, the power source equipment of the above system supplies power to a powered device via two signal/power channels, each consisted of two twisted pairs, respectively. In such a case, the connection between/among the power source equipment and the powered device(s) may be in different configurations: 1) one single powered device is connected to two channels (all of the four twisted pairs, FIG. 1) simultaneously, to receive a higher power; 2) two powered devices are respectively connected to one channel (two twisted pairs, FIG. 2) to receive power from each channel; and 3) one powered device is connected to one of the two channels (two of the four twisted pairs, FIG. 3 and FIG. 4) to receive power from the one channel.

As mentioned above, the IEEE PoE standards require the power source equipment of a PoE system to inspect the powered devices before it supplies power thereto. In the inspection, the power source equipment applies a detection signal to a particular channel and measures a response signal from the channel after a predetermined period of time. The response signal is then used to determine whether an external device (device under test) is in connection with the channel and whether the device under test is a qualified powered device. However, when the power source equipment has two or more power source devices and two or more signal/power channels, the inspection method described above will not work correctly; wrong inspection results will be expected.

For example, in the case of FIG. 1, when the power source equipment 100 sends a detection signal to the twisted pairs D1 and D2 of the first channel, a response signal will be received by the power source equipment 100, because a powered device 20 as shown in FIG. 1 is connected to the power source equipment 100. The response signal will be used to calculate an impedance value. As the impedance value falls in the effective range, the powered device 20 is determined suitable for supplying power and power is supplied thereto. However, when the power source equipment 100 sends a detection signal to the twisted pairs D3 and D4 of the second channel, because the powered device 20 is also connected to the second channel, the impedance value of the level of the detected response signal will exceed the effective range, resulting in failure of the detection. As a result, the power source equipment 100 will not supply power to the second channel, because detection in the second channel fails. In such a case, however, the powered device 20 is usually a high power consumption device. Since the power source equipment 100 supplies power only to the first channel, the supplied power will not meet the needs of the powered device 20, resulting in failure of the dual-channel architecture in providing higher power using the two channels.

U.S. Pat. No. 8,305,906 B2 discloses a method for detecting powered devices in a PoE system. The method detects whether or not a two-channel signal cable having four twisted pairs is connected to the same powered device and comprises the steps of generating a detection signal for one channel and detecting a response signal from the other channel. When the response signal indicates that the target device connected to the channel is not a qualified powered device, the power source equipment determines that both channels are connected to one powered device.

U.S. Pat. No. 9,281,691 B2 discloses a device for detecting whether or not, in a power source equipment of a PoE system, a dual-channel signal cable having four twisted pairs is connected to one same powered device. The detection includes sending a detection signal to both channels at the same time. When the response signal from one channel indicates that a qualified powered device is connected to that channel, the impedance value of the response signals from the two channels is evaluated. If they fall within a specific range, it is determined that the two channels are connected to one same powered device and the power source equipment supplies power to the two channels simultaneously.

In view of the prior art technology, there is a need in the industry to provide a multiple channeled power source equipment for the PoE system, in order to supply higher power to high power consumption device in connection with the PoE system. It is especially necessary to provide a PSE for PoE system with a simplified framework and/or method, while correct detection/determinations can be realized.

In addition, due to more than one power source device is used in the power source equipment, in any one of the connection configurations in FIGS. 1 to 4 it is necessary to detect the overload status and/or open circuit status of the powered device and to react accordingly, in order to protect the system and maintain the dual channel architecture in correct operations.

SUMMARY OF THE INVENTION

The objective of the present invention is to provide a novel power source equipment for the Power over Ethernet (PoE) system, wherein the power source equipment comprises multiple power source devices and the multiple power source devices can supply power to one same powered device simultaneously.

Another objective of this invention is to provide a multiple channeled power source equipment for the PoE system, wherein the power source equipment correctly detects and determines the connection configuration of the powered device(s) and supplies correct power to the powered device (s).

Another objective of this invention is to provide a multiple channeled power source equipment for the PoE system, wherein the power source equipment correctly detects an overload status and/or an open circuit in the system.

According to the present invention, a power source equipment for the PoE system is disclosed and comprises a plurality, preferably two power source devices, each providing electric power, preferably a power in compliance with the IEEE 802.3af and/or IEEE 802.3at standards, through one signal/power channel, independently, wherein the signal/power channel comprises at least two twisted pairs and a power connector in connection with the twisted pairs. The electrical connector may be a signal cable connector, preferably a signal cable connector for the Ethernet network.

In a preferred embodiment of the invention, the power source equipment comprises a first powered device in connection with a first connector through a first signal/power channel and a second powered device in connection with a second connector through a second signal/power channel. Each powered device is configured to: apply a detection signal to the signal/power channel connection thereto and obtain a response signal from the signal/power channel after a predetermined period following the detection signal; determine, based on the response signal, whether the channel is in connection with a device under test; and determine whether the device under test is a qualified powered device, preferably a powered device in compliance with the IEEE802.3af and/or IEEE802.3at standard. If the device under test is determined a qualified powered device, the power source device supplies power to the powered device; otherwise, no power is supplied by the powered device.

The power source equipment is further configured to: determine whether another powered device of the power source equipment is connected by a qualified powered device, after the powered device determines the channel is connected by a device under test but the device under test is not a qualified powered device;
determine the two power source devices are connected by one same powered device, if the preceding determination is positive;
set a maximum power value to the two power source devices respectively; and
actuate both power source devices to supply power to the channels using the maximum values. In the preferred embodiments of this invention, the maximum values for the power source device and the other power source device may be identical, while in other embodiments, they are different.

The power source device may be configured to accept a setting of the maximum value by the other power source device.

In a specific embodiment of the invention, in the power source equipment the first and second power source devices are a default group of power source devices with respective maximum power values. In such embodiments, the second power source device determines the two power source devices are in connection with the same powered device, whereby the two power source devices supply power to the two channels using the respective maximum values, when the first powered device determines the first power source device is connected by a qualified powered device and the second power source device determines the second power source device is in connection with a device under test but the device under test is not a qualified powered device.

In a preferred embodiment of the invention, the determination of whether the two power source devices are connected to one same powered device further comprises the step of determining whether the two power source devices are suited for supplying high power. When a result of determination is positive, the two power source devices are determined being connected to one same powered device.

In most applications of the present invention, the power source devices are a power source device in compliance with the IEEE802.3af and/or IEEE802.3at standards.

The power source equipment of the present invention further comprises an overload status and open circuit detection mechanism, whereby the power source equipment adjusts power supplied to a power source device according to a result of detection of the detection mechanism.

In particular embodiments of the invention, the power source equipment further comprises a control device to monitor and/or control the detection, classification and power supply of the powered device.

These and other objectives and advantages of the present invention may be clearly appreciated from the following detailed description by referring to the following drawings.

SCHEMATIC SIMPLE EXPLANATION

EMBODIMENT

In the followings, the power source equipment for Power over Ethernet (PoE) system of this invention will be described by referring to several embodiments thereof.

The present invention provides a novel power source equipment for the PoE system. The power source equipment has at least two power source devices, in particular power source devices in compliance with the IEEE802.3af and/or IEEE802.3at standards. Each power source device supplies electric power through a signal/power channel separately. The present invention in particular provides a method and device to inspect possible powered devices in connection with the power source equipment. To be specific, the invented method and device detect and determine:

1. Whether each of the at least two signal/power channels of the powered source equipment is connected by a powered device.

2. Whether a powered device in connection with the signal/power channel is suitable for supplying power.

3. Whether two of the at least two signal/power channels are connected to the same powered device.

4. Whether any of the signal/power channels is overloaded or forms an open circuit.

In most conventional PoE systems, the power source equipment is capable of detecting whether or not a signal/power channel is in connection with a device under test and whether the connected device is suitable for supplying power, i.e., a qualified powered device. However, the power source equipment of the conventional PoE system provides only one power supply channel and one power source device, that is, a signal and/or power channel consisted of two twisted pairs, to supply power to one powered device. A powered device detection mechanism used in the conventional powered source equipment cannot correctly detect and determine the connection configuration of powered devices in a multichannel powered source equipment.

Figure 1:
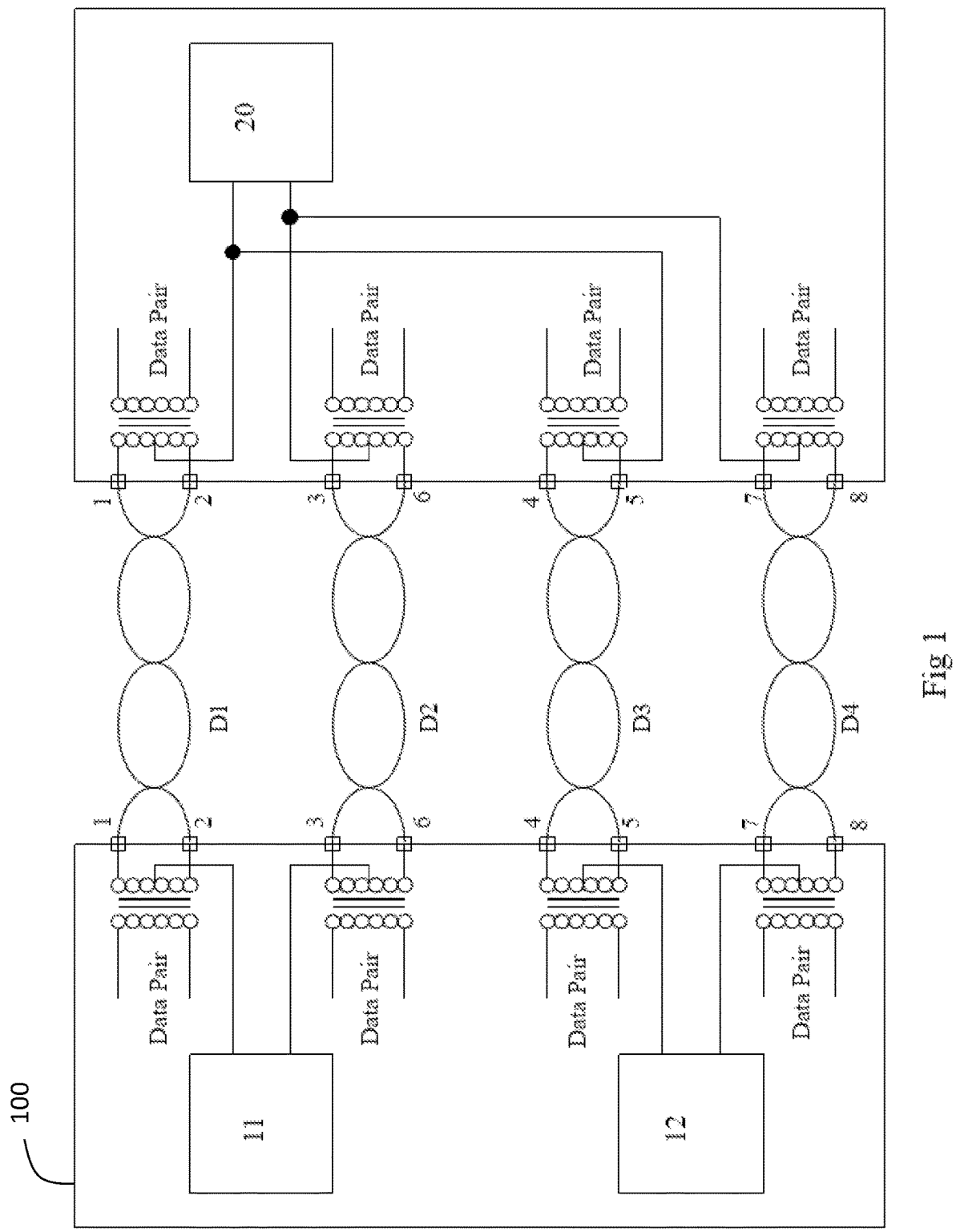
FIG. 1 shows the schematic diagram of a power source equipment for Power over Ethernet system according to the invention, wherein one powered device connects to multiple power source devices simultaneously.
Figure 2:
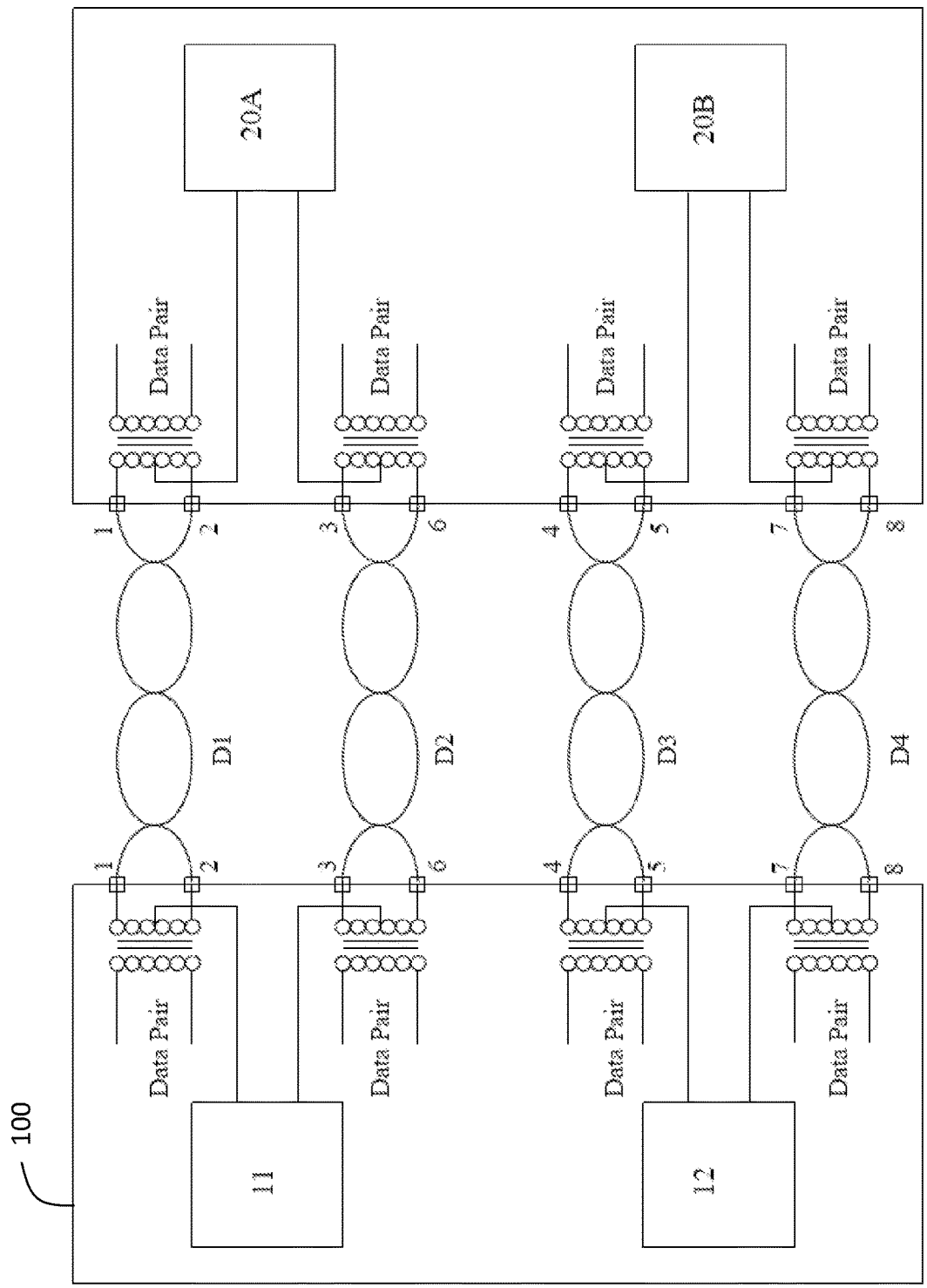
FIG. 2 shows the schematic diagram of a power source equipment for Power over Ethernet system according to the invention, wherein multiple powered devices connect to multiple power source devices respectively.
Figure 3:
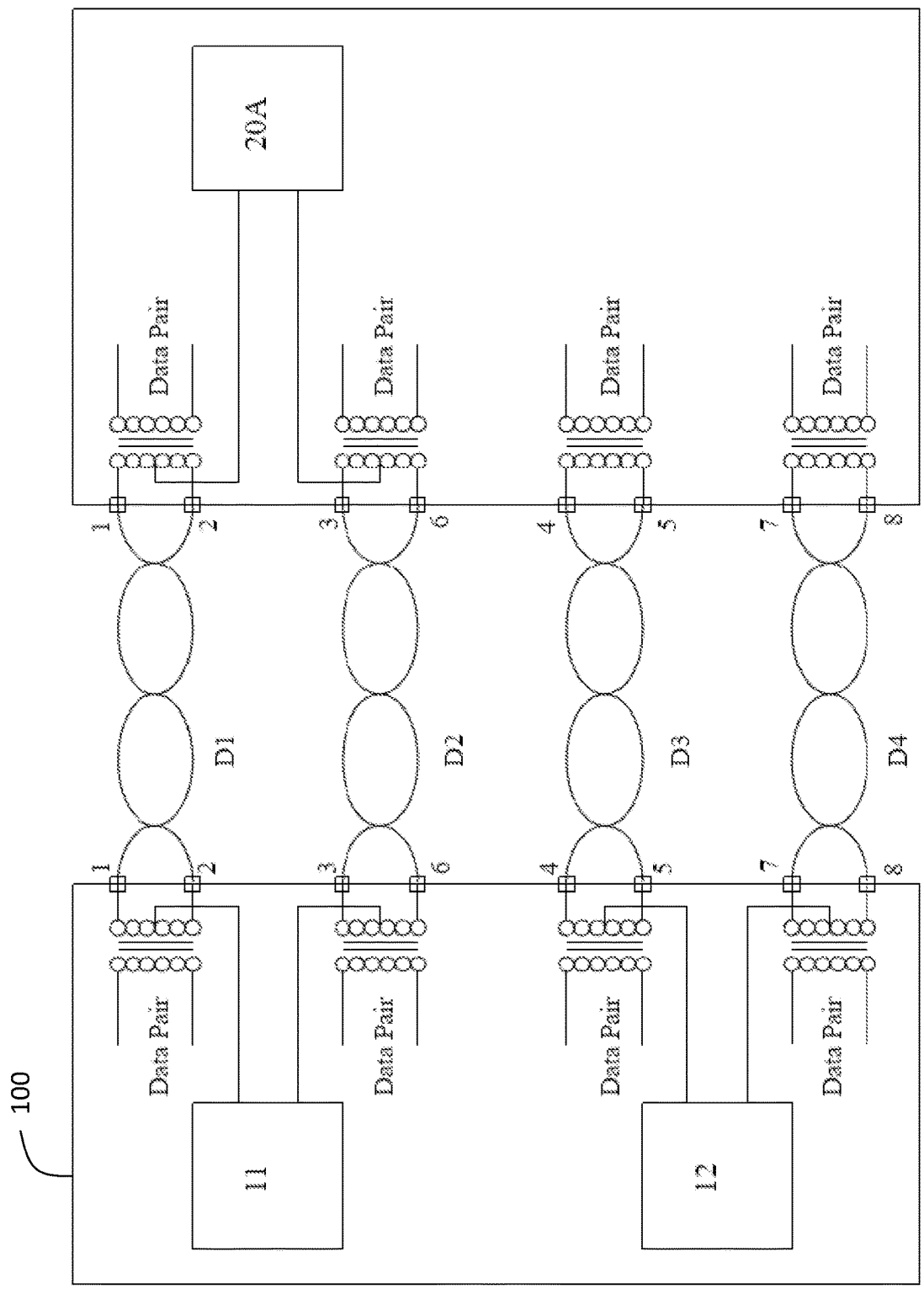
FIGS. 3 and 4 show respectively the schematic diagram of a power source equipment for Power over Ethernet system according to the invention, wherein one powered device connects to one of multiple power source devices.
Figure 4:
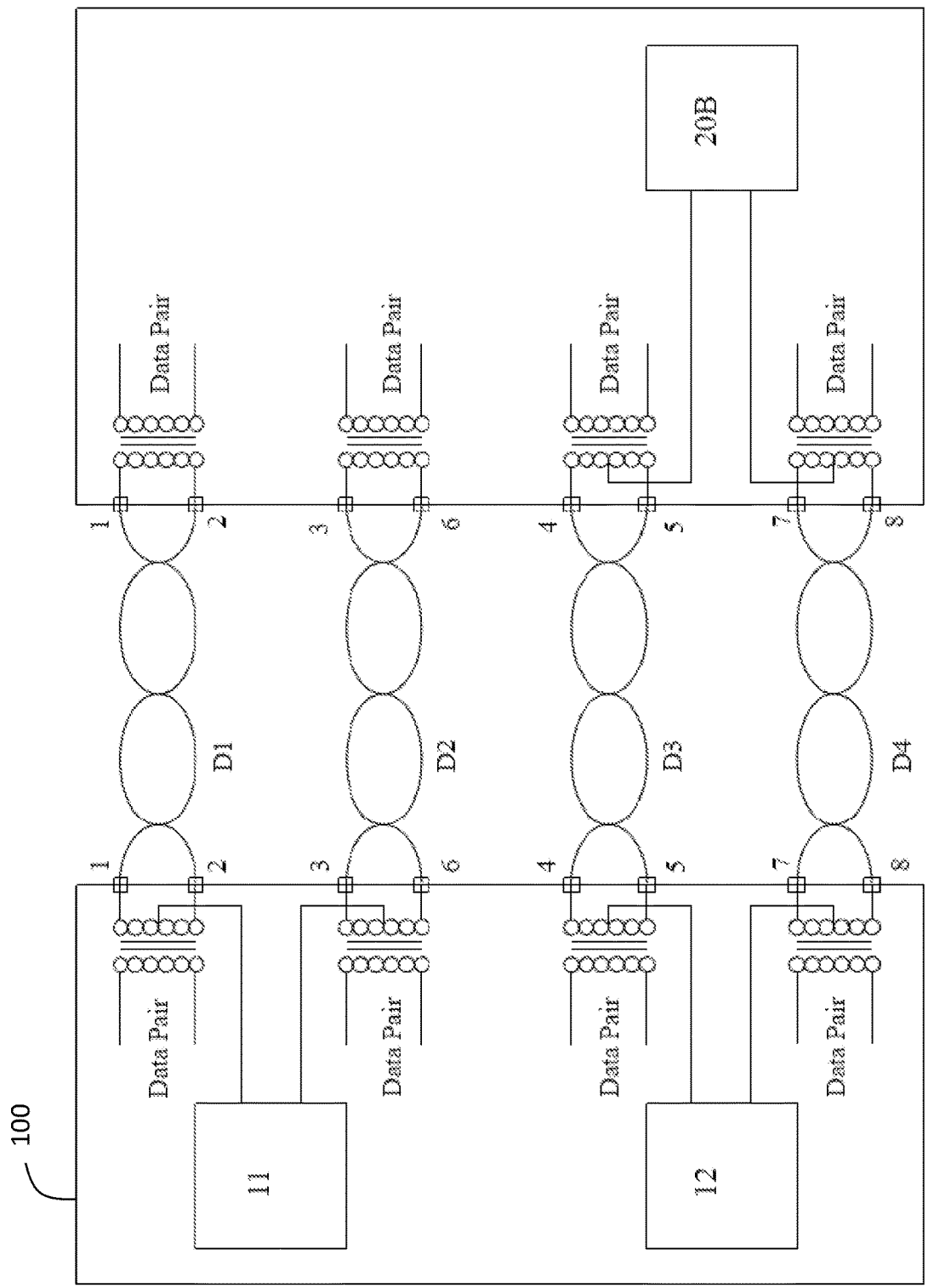

FIGS. 1 to 4 show possible connection configurations of a power source equipment 100 having multiple power source devices, with powered devices 20, 20A and 20B connected thereto. In each figure, the power source equipment 100 has two power source devices 11, 12, each in connection with one signal/power channel D1/D2 and D3/D4. The signal/power channels D1/D2 and D3/D4 may be connected by powered devices 20, 20A, 20B, to transmit/receive signals and/or supply power to the powered devices 20, 20A, 20B. Among the figures, in the configuration of FIG. 1 two power source devices 11, 12 are in connection with one powered device 20 simultaneously through two signal/power channels D1/D2 and D3/D4. In the configuration of FIG. 2, two power source devices 11, 12 are in connection with two different powered devices 20A and 20B respectively through each of the two signal/power channels D1/D2 and D3/D4. In the configuration of FIG. 3 or 4, only one power source device 11 or 12 is in connection with a powered device 20A or 20B through one of the signal/power channels D1/D2 (FIG. 3) and D3/D4 (FIG. 4), although two signal/power channels are provided. In addition to the configurations shown above, it is also possible that no channel is connected by any powered device.

Figure 5:
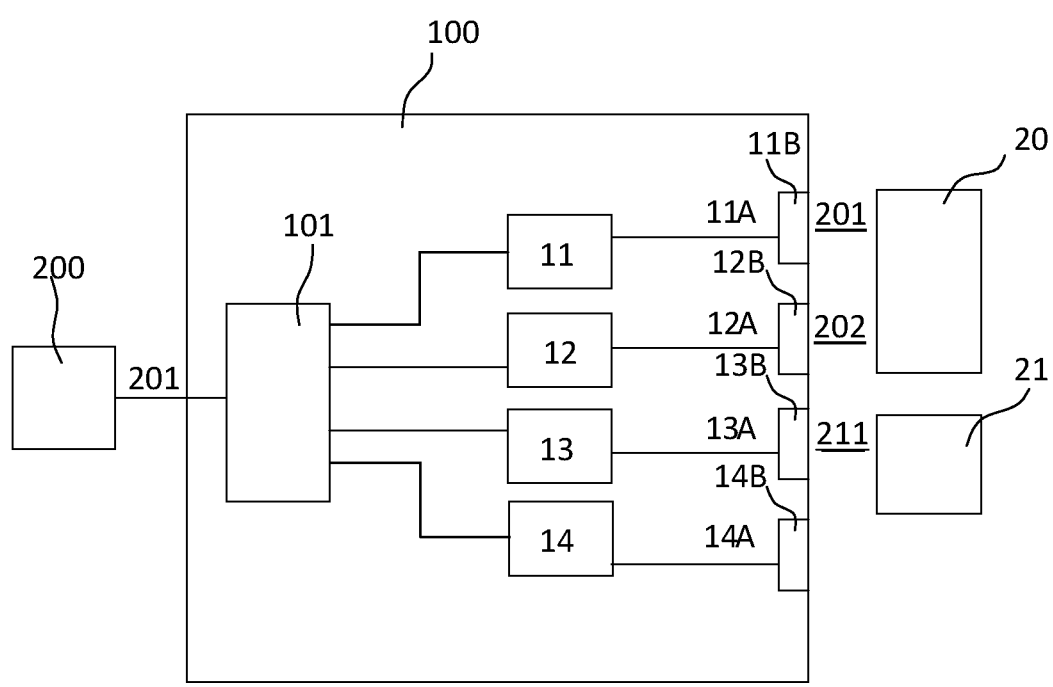
FIG. 5 shows the block diagram of one embodiment of the power source equipment for Power over Ethernet system of this invention.

The present invention provides a novel detection mechanism to inspect the configuration in the connection of powered devices with the power source equipment in a PoE system. FIG. 5 shows the block diagram of one embodiment of the power source equipment for PoE system of the present invention. As shown, the power source equipment 100 for PoE system of this invention comprises a plurality of power source devices 11, 12, 13 and 14. Each of the power source devices 11, 12, 13 and 14 may be a power source device in compliance with the IEEE802.3af and/or IEEE802.3at standard. The power source equipment 100 is embedded in a PoE system. The power source equipment 100 and a host computer 200 form a power supply system for the PoE system, to provide power supplied by the host computer 200 to the powered devices 20, 21 through network cable 201. As shown in FIG. 5, power and signals supplied/provided by the host computer 200 enter the I/O interface 101 of the power source equipment 100 via network cable 201 and are fed to each of the power source devices 11, 12, 13 and 14. The power source equipment 100 also provides a plurality of connection ports 11B, 12B, 13B and 14B, each being in connection with a power source device 11, 12, 13, 14 via a signal/power channel 11A, 12A, 13A and 14A, whereby external devices (devices under test) 20, 21 can connect the connection ports 11B, 12B, 13B and 14B via a network cable 201, 202, 211, to receive electric power from each of the power source devices 11, 12, 13 and 14. Although 4 signal/power channels and 4 connection ports are shown in this figure, those having ordinary skills in the art may appreciate, these are not any technical limitation. In general cases, a power source equipment would provide 8 channels and 8 connection ports. Any number greater or less than 8 is also applicable. In this figure, shown are two devices 20 and 21, with device 20 in connection with connection ports 11B, 12B and device 21 in connection with connection port 13B. No external device is in connection with connection port 14B. In such a configuration, external device 21 should be a qualified, low or medium power consumption device, although it is still possible that device 21 is not an IEEE standard compliant device. The main function of the power source equipment 100 is to provide power supplied by host computer 200 to any of the external devices 20, 21 that is suitable for supplying power.

Power source equipment for the PoE system having the structure described above is known to the industry and described in a variety of technical literature, including the IEEE 802.3af, IEEE 802.3at and other industrial standards. Details thereof are thus omitted.

As mentioned above, a power source equipment in compliance with the IEEE 802.3af and/or IEEE 802.3at standards must detect to determine whether an external device is connected to a signal/power channel connected to it and, if yes, whether the external device is a qualified powered device. If the determination is positive, the power source equipment further classifies the powered device in respect of a power level to be supplied. If the determination is negative, no power would be supplied to the particular signal/power channel. Power source equipment capable of such detection, classification and action is available in the market and described in a variety of technical literature. However, the conventional technology did not provide a simplified process for the power source equipment to determine whether multiple signal/power channels are in connection with one same powered device.

Figure 6:
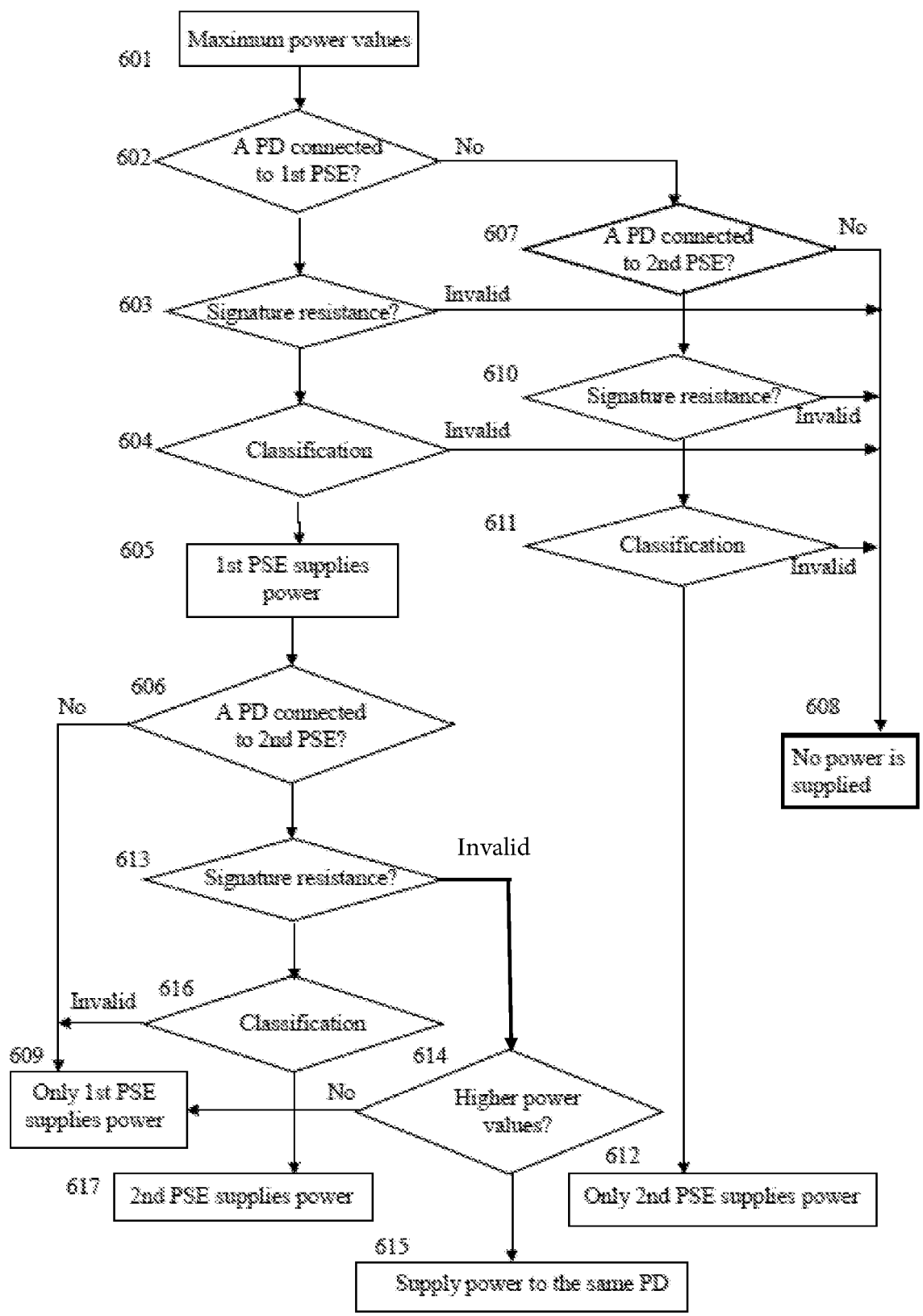
FIG. 6 shows the flowchart of one embodiment of the method for detection of powered devices in a Power over Ethernet system of this invention.

According to the power source equipment for PoE system of the present invention, further steps are taken, when one power source device determines the external device connected thereto is not a qualified power source device, in order to provide useful information for the determination of whether multiple signal/power channels are connected by one powered device. FIG. 6 shows the flowchart of a detection method for powered devices used in the power source equipment for PoE system of this invention. As shown in this figure, at step 601, the system determines power source devices 11 and 12 are a default group of power source devices and sets their respective maximum power values. Members of a default group and their maximum power values may be set automatically by the system or manually by a user. It is also possible for the manufacturer to set the defaults upon completion of the device. In step 602, the first power source device 11 detects to determine whether an external device (device under test) is connected to the first signal/power channel. The detection includes the steps of applying a detection signal to the first signal/power channel D1, D2 (11A in FIG. 5) and receiving a response signal from the first signal/power channel D1, D2 after a predetermined period of time. The detection signal is preferably a voltage signal, so that a current signal as the response signal may be obtained. Of course, the detection signal may also be a current signal for a voltage signal as the response signal. If no response signal is detected, the first power source device 11 determines no device is connected to the first signal/power channel D1, D2. If a response signal is received, at step 603 the first power source device 11 further determines whether the device under test is a qualified powered device. As mentioned above, in the conventional art, when the resistance value represented by the response signal falls within the range from 19 to 26.5 KOhm, the device under test is determined a qualified powered device, i.e., a powered device complying with the IEEE PoE standards. Other criteria provided by the IEEE PoE standards include: The voltage value of the detection signal shall be between 2.8V to 10V; its current value must be less than about 5 mA. The voltage value of the detection signal shall have a difference of at least 1V between its elements.

If the determination in step 603 results at Yes, in step 604 the first power source device 11 classifies the first signal/power channel D1, D2. The classification process may include the steps of applying a classification signal, receiving a class response signal and classifying a powered device in respect of power level to be supplied thereto. The classification process is also described in the above-mentioned IEEE 802.3af and IEEE 802.3AT standards, with steps very similar to that of the detection process described above. If a class is successfully assigned to the signal/power channel/powered device, at step 605 the first power source device supplies power to the first signal/power channel/powered device; otherwise, the step proceeds to 608, wherein neither the first power source device 11 nor the second power source device 12 supplies power to the signal/power channel connected thereto. After the first power source device 11 starts to supply power, at step 606 the second power source device 12 detects to determine whether an external device is connected to the second signal/power channel D3, D4 (12A in FIG. 5). The detection process includes the steps of applying a detection signal to the second signal/power channel D3, D4 and receiving a response signal from the second signal/power channel D3, D4 after a predetermined period of time. If no response signal is detected, the second power source device 12 determines no device is connected to the second signal/power channel D3, D4. The step proceeds to 609, wherein only the first power source device supplies power.

If the determination in steps 602 results at No, it may be preliminarily determined that no device is connected to the first signal/power channel D1, D2. When this happens, at step 607 the second power source device 12 takes over to detect and determines whether an external device is connected to the second signal/power channel D3, D4. The detection process includes the steps of applying a detection signal to the second signal/power channel D3, D4 (12A in FIG. 5) and receiving a response signal from the second signal/power channel D3, D4 after a predetermined period of time. If no response signal is detected, the second power source device 12 determines no device is connected to the second signal/power channel D3, D4. The step proceeds to 608, wherein neither the first power source device 11 nor the second power source device 12 supplies power. If a response signal is received, at step 610 the second power source device 12 further determines whether the detected device under test is a qualified powered device. As mentioned above, in the conventional art, when the resistance value represented by the response signal falls within the range from 19 to 26.5 KOhm, the device under test is determined a qualified powered device, i.e., a powered device complying with the IEEE PoE standards.

If the result of step 610 is No, the step proceeds to 608, wherein neither the first power source device 11 nor the second power source device 12 supplies power. Otherwise, if the result is Yes, at 611 the second power source device 12 classifies the second signal/power channel D3, D4. If a class is successfully assigned to the signal/power channel/powered device, at step 612 the second power source device supplies power to the second signal/power channel/powered device, while the first power source device 11 does not supply power. If the classification fails, the step proceeds to 608, wherein neither the first power source device 11 nor the second power source device 12 supplies power.

If step 603 results at No, the step proceeds to 608, wherein neither the first power source device 11 nor the second power source device 12 supplies power.

If the determination of step 603 results at yes, it may be determined that both the first power source device 11 and the second power source device 12 are connected by a device under test. Therefore, at step 613, the second power source device 12 further determines whether the device connected thereto is a qualified powered device. If the result is No, it may be determined that both the first power source device 11 and the second power source device 12 are connected by the same device under test. At step 614, the system determines whether both the first power source device 11 and the second power source device 12 are suited for supplying higher power. To enable the determination of step 614, a parameter needs to be set to both power source devices beforehand. This setting may be made when the maximum power value of the two power source devices 11, 12 is set (step 601) or afterward by the user in step 614. If the result of determination is Yes, at step 615, both the first power source device 11 and the second power source device 12 supply power to the powered device 20 under the predetermined maximum power value. Otherwise, the step proceeds to 609, wherein only the first power source device 11 supplies power to the powered device 20.

If the result of step 613 is positive, it can be determined that the first power source device 11 and the second power source device 12 respectively connect to different powered devices. Therefore, at step 616 the second power source device 12 classifies the second signal/power channel/powered device.

If in step 616 the classification fails, it is determined that the device under test in connection with the second power source device 12 is not a qualified powered device. Therefore, the step proceeds to 609, wherein only the first power source device 11 supplies power to the power source device 20. If in step 616 a power level class is successfully assigned to the second signal/power channel D3, D4, at step 617 the second power source device 12 supplies power to the powered device 21. In step 617 each power source device supplies power to one powered device connected thereto.

The detections and determinations described above may be executed by an independent control device or by the second power source device alone. For example, after the second power source device decided that a device under test is connected to the second power source device but the device under test is not a qualified powered device, it may further proceed to determine whether the first power source device is in connection with a qualified powered device and, if the previous determination results at Yes, it determines that the two power source devices are in connection with the same powered device. The second power source device may further set a maximum power value for the first and second power source devices and initialize to supply power to the two signal/power channels they connect. In the preferred embodiments, the maximum power value for the first power source device may be the same as or different from that of the second power source device. In addition, the first/second power source device may be configured to accept a maximum power value set by the other power source device.

In the process of detection and determination, no power will be supplied by a power source device, as long as it is determined not in connection with an external device. This ensures no power will be supplied to a signal/power channel that is an open circuit. In addition, before determining whether the two power source devices are connected with the same powered device, the method determines whether the two power source devices are suited for supplying high power. This avoids overload of power in any of the signal/power channels.

The foregoing is a description of several embodiments of the power source equipment for Power over Ethernet of the present invention. It will be appreciated by those skilled in the art that embodiments of the present invention may be modified with known techniques to achieve the same or similar effects. Therefore, these modifications are within the scope of the present invention.

What is claimed is:

1. A power source equipment for Power over Ethernet (PoE) system comprising two power source devices, each of the two power source devices providing electric power through one signal/power channel connected thereto, wherein the each of the two power source devices is configured to:
   apply a detection signal to the signal/power channel connected thereto and obtain a response signal from the signal/power channel after a predetermined period following the detection signal;
   determine, based on the response signal, whether the signal/power channel is in connection with a device under test;
   determine whether the device under test is a qualified powered device;
   wherein a device under test is determined a qualified powered device, if it complies with the IEEE 802.3af and/or IEEE 802.3at standard; and
   if the device under test is determined a qualified powered device, supply power to the signal/power channel; otherwise, supply no power to the signal/power channel;
   wherein a first power source device of the two power source devices is further configured to:
   determine whether a second power source device of the power source equipment is connected to a qualified powered device, after the first power source device determines the signal/power channel connected to the first power source device is connected to a device under test but the device under test is not the qualified powered device;
   determine the two power source devices are connected to one same powered device, if the preceding determination is positive;
   set maximum power values to each of the two power source devices respectively; and
   actuate both power source devices to supply power to the signal/power channels using the maximum values.

2. The power source equipment for PoE system of claim 1, wherein the maximum power level of the first power source device is identical with that of the second power source device.

3. The power source equipment for PoE system of claim 1, wherein the maximum power level of the first power source device is different from that of the second power source device.

4. The power source equipment for PoE system of claim 1, wherein the signal/power channels of the two power source devices each comprise at least two twisted pairs.

5. The power source equipment for PoE system of claim 1, wherein determination of whether the two power source devices are connected to one same powered device further comprises the step of determining whether the two power source devices are suited for supplying high power; and wherein when a result of determination thereof is positive, the two power source devices are determined to be connected to one same powered device.

6. The power source equipment for PoE system of claim 1, further comprising a signal cable connector connected to each of the signal/power channels of the two power source devices.

7. The power source equipment for PoE system of claim 6, wherein the signal cable connector is an Ethernet signal cable connector.

8. A power source equipment for Power over Ethernet (PoE) system comprising a plurality of power source devices, each power source device providing electric power through one signal/power channel connected thereto, wherein each power source device is configured to:
   apply a detection signal to the signal/power channel connection thereto and obtain a response signal from the signal/power channel after a predetermined period following the detection signal;
   determine, based on the response signal, whether the channel is in connection with a device under test;
   determine whether the device under test is a qualified powered device;
   wherein a device under test is determined a qualified powered device, if it complies with the IEEE 802.3af and/or IEEE 802.3at standard; and if the device under test is determined a qualified powered device, supply power to the signal/power channel; otherwise, supply no power to the signal/power channel;

wherein respective a maximum power values are set to each of a first power source device and a second power source device as a default group of power source devices and wherein the second power source device is further configured to determine whether the two power source devices are in connection with the same powered device, whereby the first and second power source devices supply power to the two channels using the respective maximum values, when the first power source device determines the first power source device is connected to a qualified powered device and the second power source device determines the second power source device is in connection with a device under test but the device under test is not a qualified powered device.

9. The power source equipment for PoE system of claim 8, wherein the maximum power level of the first power source device is identical with that of the second power source device.

10. The power source equipment for PoE system of claim 8, wherein the maximum power level of the first power source device is different from that of the second power source device.

11. The power source equipment for PoE system of claim 8, wherein the signal/power channels of all of the power source devices each comprise at least two twisted pairs.

12. The power source equipment for PoE system of claim 8, wherein determination of whether the two power source devices are connected to one same powered device further comprises the step of determining whether the two power source devices are suited for supplying high power; and wherein when a result of determination thereof is positive, the two power source devices are determined to be connected to one same powered device.

13. The power source equipment for PoE system of claim 8, further comprising a signal cable connector connected respectively to each of the signal/power channels of all the power source devices.

14. The power source equipment for PoE system of claim 13, wherein the signal cable connector is an Ethernet signal cable connector.

* * * * *